(No Model.)  5 Sheets—Sheet 1.

B. C. BRADLEY.
SEEDING MACHINE.

No. 270,627. Patented Jan. 16, 1883.

Witnesses:
Albert H. Adams.
Edgar T. Bond

Inventor:
Byron C. Bradley
By West & Bond.
His attys.

(No Model.)  5 Sheets—Sheet 2.
B. C. BRADLEY.
SEEDING MACHINE.

No. 270,627. Patented Jan. 16, 1883.

Witnesses:
Albert H. Adams
Edgar T. Bond

Inventor:
Byron C. Bradley
By West & Bond
His Atty's (No Model.)
B. C. BRADLEY.
SEEDING MACHINE.
No. 270,627.
5 Sheets—Sheet 3.
Patented Jan. 16, 1883.
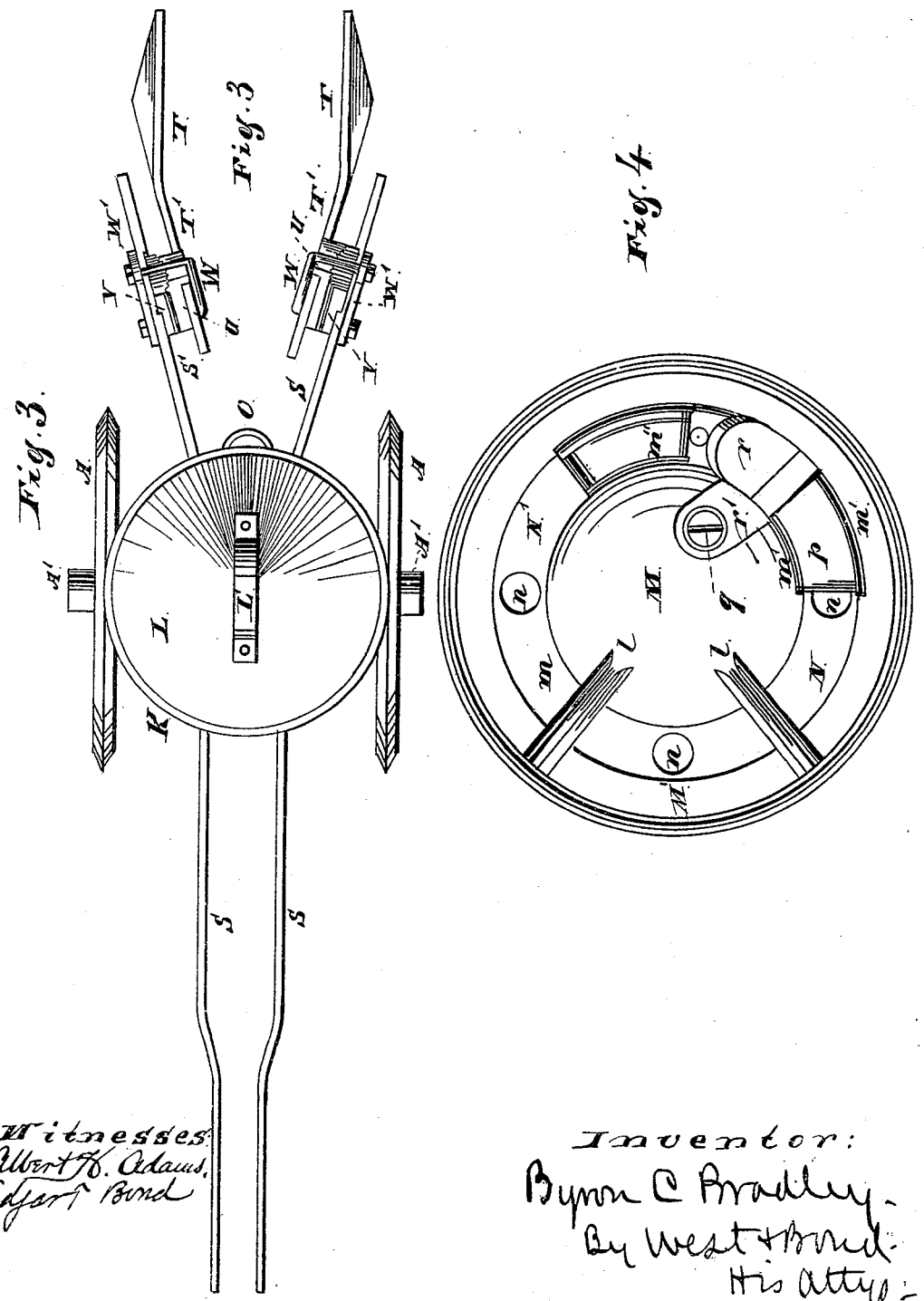
Witnesses
Albert H. Adams
Edgar Bond
Inventor:
Byron C Bradley
By West & Bond
His Attys (No Model.) 5 Sheets—Sheet 4.
B. C. BRADLEY.
SEEDING MACHINE.
No. 270,627. Patented Jan. 16, 1883.
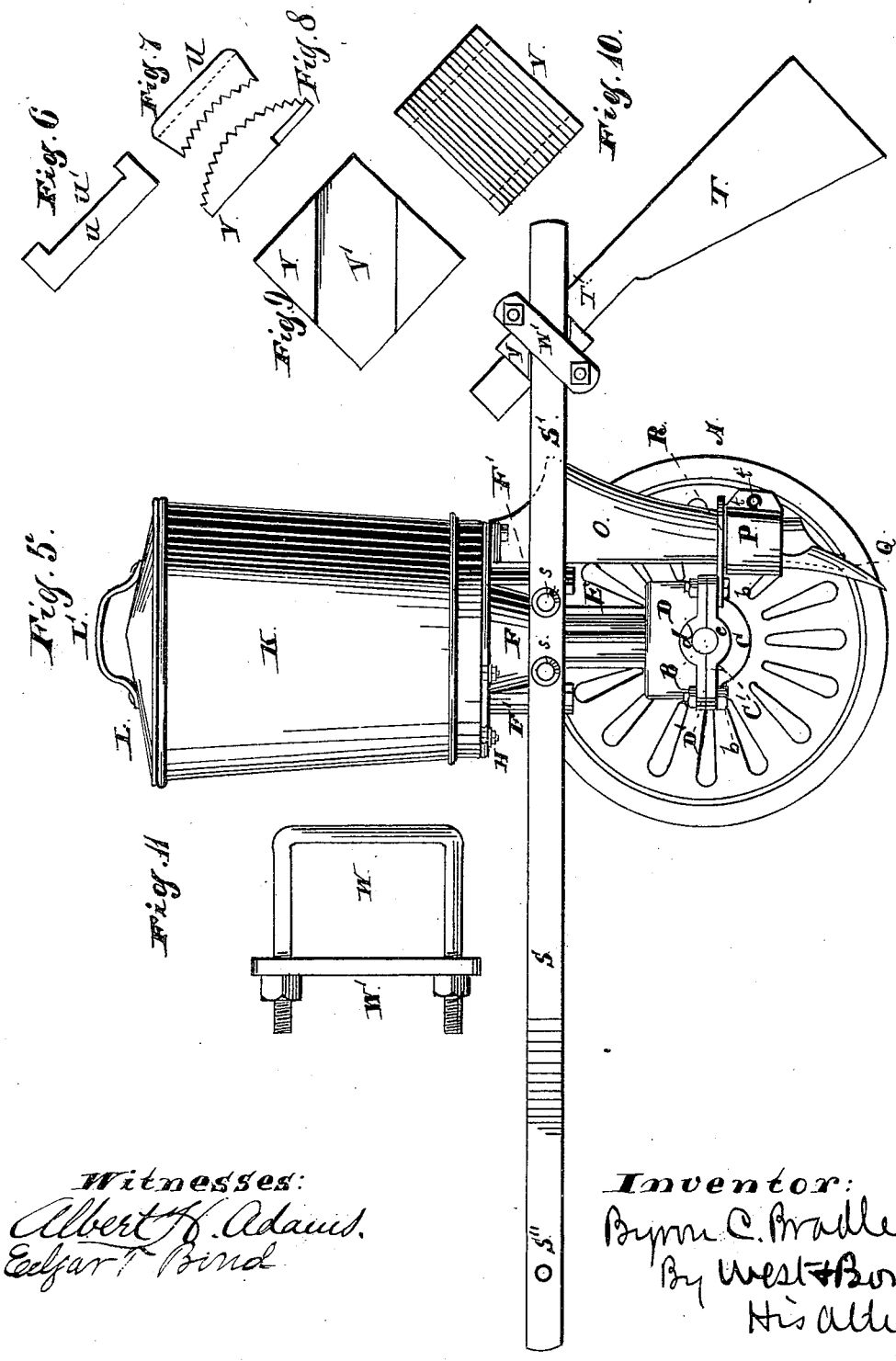
Witnesses:
Albert H. Adams.
Edgar T. Bond
Inventor:
Byron C. Bradley
By West & Bond
His Atty (No Model.)  B. C. BRADLEY.  5 Sheets—Sheet 5.
COMBINED PLOW STANDARD.
No. 270,627.  Patented Jan. 16, 1883.
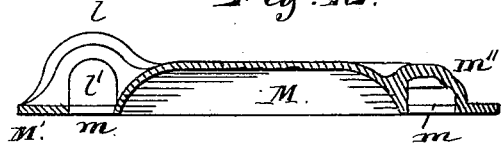
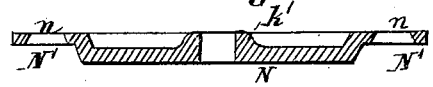
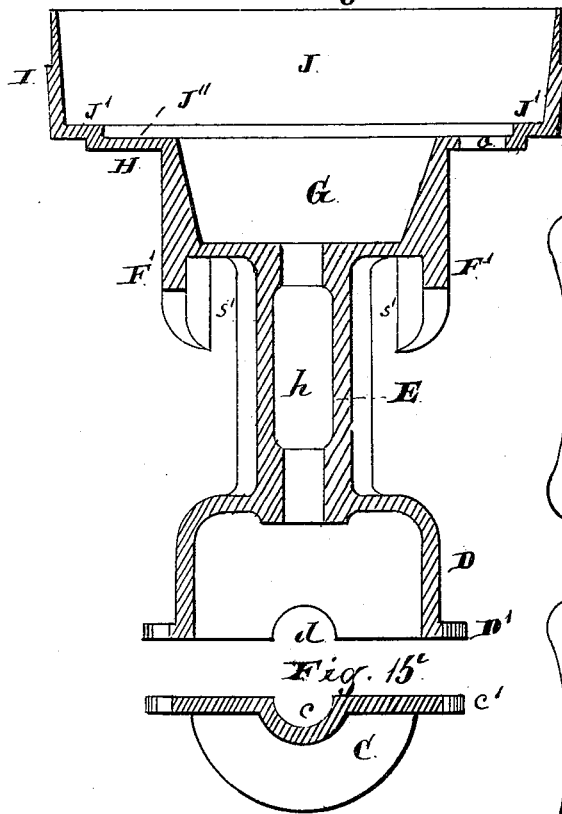
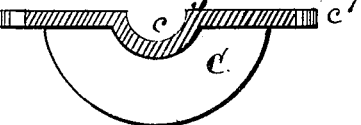
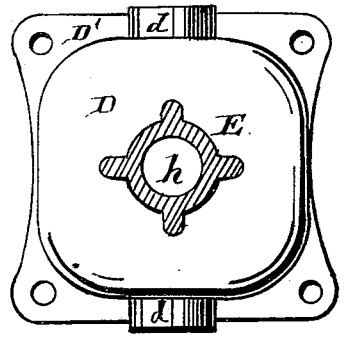
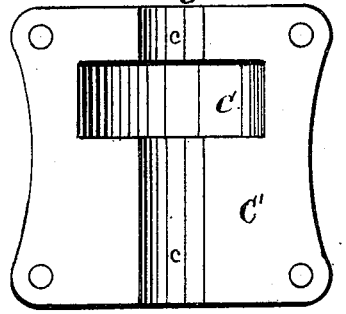
Witnesses:
Albert H. Adams.
Edgar T. Bird.
Inventor:
Byron C. Bradley.
By West & Bond
His Att'ys

United States Patent Office.

BYRON C. BRADLEY, OF CHICAGO, ILLINOIS, ASSIGNOR TO THE FURST & BRADLEY MANUFACTURING COMPANY, OF SAME PLACE.

SEEDING-MACHINE.

SPECIFICATION forming part of Letters Patent No. 270,627, dated January 16, 1883.

Application filed March 28, 1882. (No model.)

*To all whom it may concern:*

Be it known that I, BYRON C. BRADLEY, residing at Chicago, in the county of Cook and State of Illinois, and a citizen of the United States, have invented a new and useful Improvement in Seeding-Machines, of which the following is a full description, reference being had to the accompanying drawings, in which—

Figure 1:
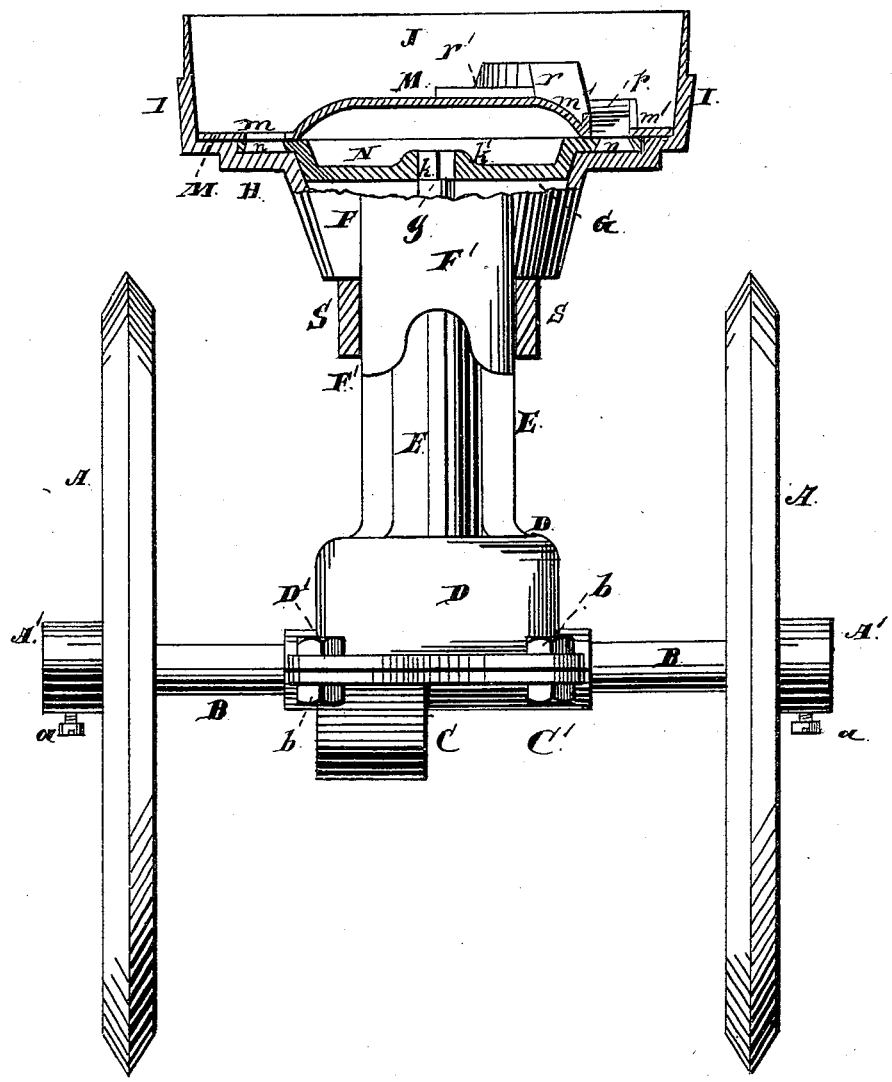
Figure 2:
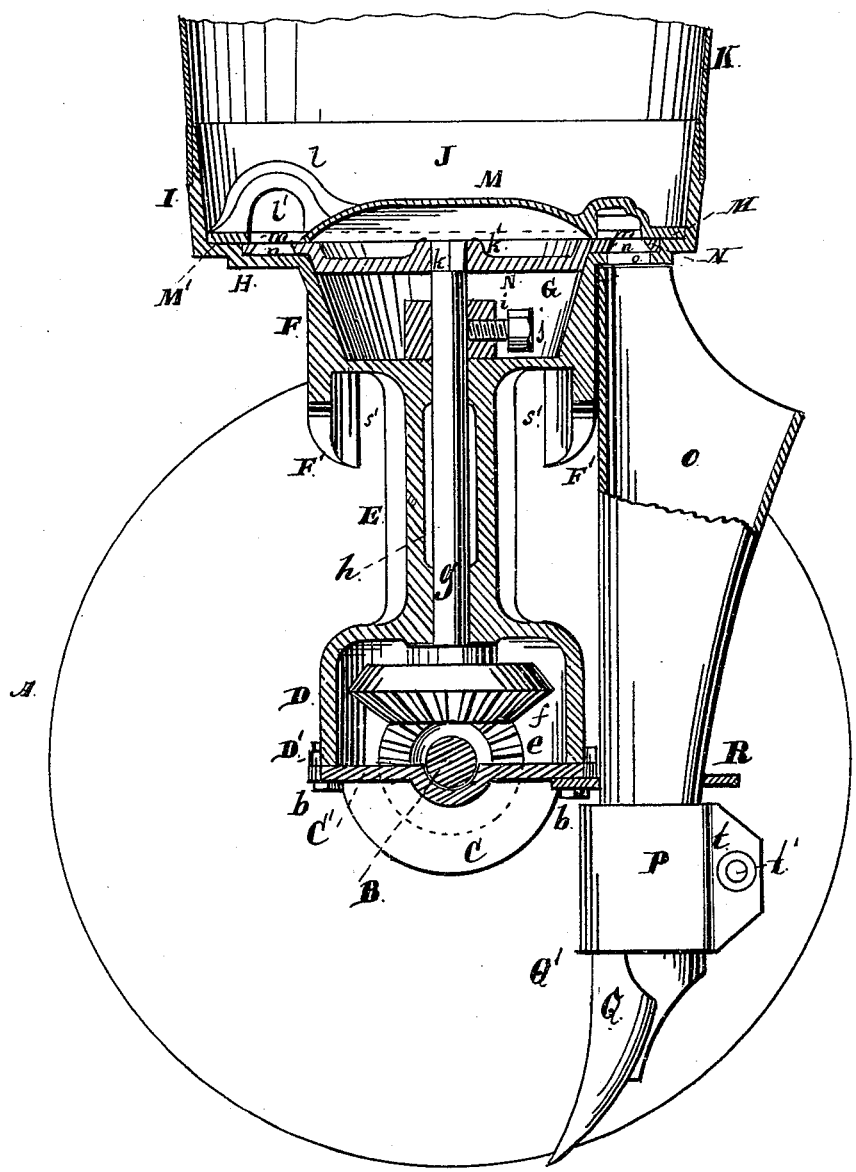

Figure 1 is an end view, showing the wheel, axle, housing, vertical shaft, and tube or support in elevation, and the support for the seed-box, the seed-dropping plate, and the cut-off plate in section; Fig. 2, a vertical section, with the upper portion of the seed-box broken off, and the lower portion of the seed duct or tube in elevation, and the bars or straps for attaching the planter to a plow removed; Fig. 3, a top or plan view of the entire planter; Fig. 4, a top or plan view of the cut-off and seed-dropping plates or disks; Fig. 5, a side elevation of the complete machine; Figs. 6, 7, 8, 9, 10, 11, details showing the device for attaching the coverers to the side bars or straps and adjusting them properly to do their work; Fig. 12, a section through the cut-off plate or disk; Fig. 13, a section of the dropper-plate; Fig. 14, a vertical section through the support which carries the dropping devices and the mechanism for operating the same; Fig. 15, a vertical section through the lower portion of the housing or box for the axle or main driving-shaft and gear-wheels; Fig. 16, a cross-section showing the upper half of the housing or boxing and the tube or casing for the vertical shaft; Fig. 17, an inner face view of the lower half of the housing or box.

This invention has for its objects to construct a seed-dropper which can be attached or applied to an ordinary plow and follow after such plow and do the required work in an effectual and reliable manner, and have the devices composing the machine simple in construction, occupying but a small space, without interfering with the operation of the plow, and at the same time performing the work of dropping as it follows after the plow, and which can be readily and quickly attached to or detached from the plow, enabling the plow to be used alone or conjointly with the dropper without any change in either device, the dropper being designed primarily for use with the plow, but at the same time being a perfect working device by itself and being capable of doing its work without the plow so far as dropping successfully is concerned. These objects I accomplish in the manner and by the means hereinafter explained, and pointed out in the claims.

In the drawings, A represents the carrying-wheels, which may be of the form shown, or any other form which can be secured firmly to an axle or shaft, so as to rotate the shaft as the wheels pass over the ground. These wheels, for use with an ordinary plow, may be about twelve inches in diameter, and they may be cast or otherwise formed to have a center or hub portion and an outer or rim portion, forming the tire, connected with the center or hub portion by a web or open-work forming the spokes. These wheels may be made of cast-iron or other suitable material, and the rim or tire portion may be formed beveled on its exterior, as shown, or may be oval, circular, flat, or other form, as desired.

B is the axle, made of a rod or bar of round iron, on the ends of which are secured the wheels A, either by means of set-screws $a$, passing through the hub of the wheel and engaging the axle or shaft, or in some other suitable manner. On this shaft or axle is rigidly secured, in any suitable manner so as to revolve therewith, a beveled-gear wheel, $e$, which is secured to the axle so as to be adjustable thereon, and may be held in position when adjusted by a set-screw passing through its hub or center, or by a key, spline, or otherwise, so as to rotate with the axle or shaft.

C C' are the lower portions of the housing or boxing, of iron or other suitable material, which can be cast or otherwise formed into shape to have a semicircular portion, C, with a depression therein to receive and form a cover for the beveled-gear wheel $e$, and a flat or plate portion, C', on two sides of which, in line with each other, are formed half-boxes or caps $c$. The flat or plate portion C' may be of the form shown or of some other suitable form. As shown, two of its sides are straight and the other two are hollowed out or concave.

D D' represent the upper portion of the housing or boxing, which may be made of iron or other suitable material that can be cast or otherwise formed into shape to have a box or housing portion, with a depression therein of sufficient dimensions to receive the beveled-gear wheel e and the beveled wheel with which it coacts, and form a covering therefor, and a flange or rim portion, D', around the exterior of D, conforming in shape to the shape of the flat or plate portion C' of the lower housing, and having on opposite sides, in line with each other, half-boxes or caps, d, which with the half-boxes or caps e form the journal-boxes for the shaft B. The flange or rim D' and the flat or plate portion C' have at each corner coinciding holes for the passage of bolts, by means of which the two sections of the housing or boxing are secured together; but other devices or means may be used for this purpose.

E is the standard or support, having a central longitudinal circular opening, h, extending its entire length. This standard or support may be cast or formed with the housing or boxing D, or it may be an independent piece secured to the boxing or housing by bolts or otherwise. As shown, it is provided with ribs or flanges for the purpose of giving additional strength; but such ribs or flanges may be dispensed with and the standard or support made thicker transversely, if so desired. As shown, this standard or support has its exterior of a circular form; but such exterior may be otherwise formed.

F is the shell or rim located on the upper end of the standard or support E, and extending above and around such upper end. This shell or rim may be cast or formed with the standard, or may be formed of an independent piece, suitably secured to the end or sides of the standard or support. As shown, this rim or shell has formed therewith downwardly-projecting lugs or lips F', between which and the face or side of the standard or support E is an opening, S'. These depending lugs or ears are located in line with each other on opposite sides of the support or standard, and their edges or sides are perpendicular or straight, and in line, or nearly so, with the plane of the rib or flange on the exterior of the rim or standard, or with the exterior of the standard itself when the rims or flanges are dispensed with. These ears or lugs might be independent pieces secured to the under side or to the sides of the shell or flange F by rivets or otherwise, if so desired.

G is the opening or concavity formed by the shell or rim F, the sides of which, as shown, are inclined.

H is a circumferential flange or rim, located at the upper end of the shell or rim F, and formed therewith, as shown, and extending out horizontally therefrom. This flange or rim H might be an independent piece secured to the shell or rim F in any suitable manner.

I is a shell or rim located around the periphery of the flange or rim H, and formed therewith, as shown; but it might be an independent piece secured to the flange or rim H in any suitable manner. The upper exterior portion of this shell or rim I is recessed or cut away so as to form a shoulder, as shown in Figs. 1 and 14; but this exterior face might be left plain, if desired.

J is the opening or concavity formed by the shell or rim I, and forming, in connection with the flange or rim H, a receptacle in which are located the cut-off and dropping-plates of the seeding devices.

K is the seed receptacle or box, formed of sheet metal or other suitable material. This receptacle is cylindrical in shape, and its sides or walls taper gradually toward the lower end to facilitate the passage of the seed downward. The lower end of this seed box or receptacle is attached to the upper end of the shell or rim H by being slipped thereover, its edge resting on or coming in contact with the ledge or shoulder formed by the recess in the form of construction shown; but it can be attached in some other suitable manner.

L is the cover for closing the top of the box or receptacle K, which may be made of sheet metal or other material formed into shape to fit into or over the end of the receptacle and form a cover therefor. As shown, this cover L is provided with a handle or strap, L', by which it can be taken off and replaced or opened and closed.

M M' represent the cut-off plate of the seed-dropping device. This plate may be made of iron or other suitable material which can be cast or otherwise formed into shape to have an annular or ring portion, M', and a central raised portion, M, the ring and center being joined on one side by arches or straps l, having an upward curve or bend to leave a passage or opening, l', beneath them, and on the opposite side the center and ring are connected by a bridge or web, m'', leaving an annular opening between them extending around from end to end of the web m'', which opening m forms a passage for the admission of seed into the holes or openings in the dropping-plate, the seed, when in the holes or openings of the dropping-plates, passing beneath the arches or straps l. On this plate M M' is located the cut-off p, the forward or acting end of which enters the opening or passage m, on each side of which, at the point where the cut-off works, is a flange or rim, m', forming guides to keep the cut-off in place and to prevent it from catching on the face of the plate when raised. This cut-off p may be of any of the usual and well-known forms of construction, having a forward or acting portion, forming the cut-off proper, and a rear or tail portion, against which a spring bears, and side trunnions or pivots supported in suitable lugs or ears, so that the forward or acting end of the cut-off is free to rise and fall, the spring acting to return the forward end after being raised. This cut-off operates in the usual manner of cut-offs of this description, and prevents the entrance of more seed than that carried by the hole or opening in the dropping-plate beneath the cut-off to be dropped. The entrance of seed beneath the cut-off, at the rear end thereof, is prevented by a cap or cover, r, having a side extension, r', by means of which and a screw, q, it is attached to the center or raised portion, M, the cap or cover being so formed as to fit over the cut-off at the rear end thereof and prevent the entrance of seed without interfering with the action of the cut-off in use.

N N' represent the annular or circular disk forming the dropping-plate. This plate or disk may be made of iron, and can be cast or otherwise formed into shape, and it may be formed as shown or in some other suitable form. As shown, it has a central portion, N, around which is a rim or ring, N', which ring is provided at regular intervals with holes or openings n for the reception of the seed to be dropped. The central portion, N, of this plate or disk fits into the upper end of the opening or concavity G, and the rim or circumference N' rests upon a ledge, J'', formed in the face of the flange or rim H, as shown in Figs. 1 and 2, and the ring portion M' of the dropping-plate rests on a ledge, J', above the dropping-plate, a sufficient space being left between the ledge J'' and the face of the ring M' to allow the dropping-plate to revolve freely, and at the same time prevent upward movement of such plate. The dropper has at the center of the portion N a hub, k', in which is a square opening, which receives the square end k of a shaft, g, which shaft passes up through the support E, and has its bearings at each end of said support. This shaft at its lower end has secured thereto a beveled-gear wheel, f, which meshes with the wheel e, by means of which the shaft g is rotated, and with it the dropping-plate N. This shaft g is held in place by a collar or ring, i, located at its upper end and locked thereto by means of a set-screw, j, or in some other suitable manner, the collar resting on or coming in contact with the end of the support E and maintaining the shaft g in position.

O is the seed duct or tube, made of iron or other suitable material which can be cast or formed into the shape shown, or other shape having a central opening for the passage of the seed. The upper end of this seed tube or duct is located to be in line with an opening, o, formed in the rim or flange H, with which opening o the openings n in the dropper-plate are brought successively into conjunction to allow the seed to passs through the opening o into the tube or duct and be discharged at the lower end thereof onto the ground.

P is a clasp or band, made of metal or other suitable material, open on one side, and having an interior opening conforming to the shape of the exterior of the seed tube or duct, but somewhat larger in diameter, and having on each side of the side opening ears or flanges t, with coinciding openings for the passage of a bolt, t', by means of which the clasp or band can be made to tightly encircle the end of the tube or duct.

Q is a shovel-shaped blade or plate, forming an opener for producing a furrow or opening for the reception of the seed. This shovel or opener may be of the form shown or other suitable form, and, as shown, has a shank or extension, Q', by means of which it is attached to the end of the seed tube or duct, the shank or extension passing beneath the clasp or band P, which, when drawn tight by the bolt t', holds the shovel firmly in position. The distance which the shovel or opener shall penetrate can be varied by raising or lowering it on the seed tube or duct, to do which all that is necessary is to loosen the band or clasp, adjust the shovel or opener, and then again tighten the band or clasp by the bolt t'. This shovel or opener is located upon the forward face of the seed tube or duct, so as to make the furrow or opening in advance of the discharge of the seed and in line with such discharge.

R is a plate attached at its forward edge by the bolts b to the under face of the lower housing. This plate has an opening corresponding in shape to the exterior shape of the seed tube or duct, through which opening the lower end of the tube or duct is passed, forming a support therefor. The upper end of the seed tube or duct has side flanges, through which bolts or screws pass, attaching the tube or duct to the flange or rim H, so that by means of the plate R and the attachment to the flange or rim H, the tube or duct is held firmly in position and moves with the standard or support E.

S is the side straps or bars connecting the planter with the plow. These bars are located one on each side of the standard or support E, and are held firmly in position by bolts s, the stems or shanks of which pass through the opening s' between the shell or rim F and the depending lugs F', the bolts s drawing each bar firmly into contact with the faces of the lugs F' and maintaining them in position. These bars extend both forward and back of the seeder, and stand parallel with each other, with a space between them, and in each bar, at the forward end, is an opening, s'', for the passage of a bolt, by means of which the bars are connected on each side of the plow beam or standard, the bolt forming a pivot to allow the planter to conform to the inequalities of the ground as the machine moves along. The rear end, S', of each bar is bent or stands outward so as to spread them apart, as shown in Fig. 3, to form a support for the coverers and bring them, one on each side of the seed tube or duct, in position to do their work. As shown, the side straps or bars, S S', are each formed from a continuous piece; but, if desired, the rear portions, S', might be formed of independent pieces suitably secured to the portions S or to the standard or support E, or in some other manner.

T are the coverers, each formed of a plate or blade, with an extension or shank, T', by means of which they are attached to the supports S'. Each coverer has its blade portion twisted or bent so as to throw the lower edge or side outward and form a surface which will gather the earth and throw or force it inward over the furrow or opening formed by the shovel or blade Q. Each blade or plate portion of the coverer, as shown, has one side or edge straight and the other diagonal or inclined, so as to widen the surface at the end sufficiently to catch the earth and turn it over onto the seed furrow or opening.

U is a block, one face of which is concave and is provided with serrations, and the opposite face is provided with a recess, U', to receive the shank T' of the coverer. This block may be square, rectangular, or other shape, and may be made of iron or other suitable material which can be cast or otherwise formed into shape to have a serrated concave face and a face opposite thereto, in which is an opening or recess.

V is a block having a convex face provided with serrations, and having on its opposite face an opening or recess, V', to receive the strap or bar S'. This block may be square, rectangular, or other shape, its shape corresponding to that of the block U, and may be made of iron or other suitable material, which can be cast or otherwise formed into shape to have a serrated convex face on one side and an opening or recess, V', on the opposite side. This block V on its convex side fits into the concavity of the block U, the serrations interlocking and preventing movement of the blocks when together.

W is a stirrup or clip passing around the blocks U V and through openings in the bars or straps S', and, through the medium of the strap or plate W' and suitable set-nuts, securing the blocks U V together and to the bars or straps S' and attaching the coverers in position. The shank T' of the coverers enters or is placed in the recess or opening V' in the block V, and the block U is placed on the side bar or strap S', which enters the recess or opening U'. The two blocks U V are brought together and the strap or clip W passed around them and through the openings in the side bar or strap, and the plate W' is placed in position and the nuts set down, securing the coverer to its side bar or strap. By making one of the blocks with a concave serrated face and the other with a convex serrated face, as shown, the block carrying the coverer can be turned or adjusted to different positions, so as to set the blade portion of the coverer at different angles and secure the proper position for the coverer to act and throw the earth over onto the furrow or opening formed by the marker or blade T, and the coverer can be adjusted to vary the depth at which it enters the ground by moving the shank T' up or down in the recess U' therefor, which operation, and also the operation of changing the angle, are very easily performed, as all that is necessary to be done after the coverer is once attached is to loosen the nuts of the stirrup or clip W sufficiently to allow the block carrying the coverer to be turned or permit the shank to be moved up or down, and after the desired adjustment is reached the parts are again firmly secured together by setting down the nuts.

In operation the planter or dropper is attached to the plow by the straps or side bars S, and both passing through the opening S', which leaves the planter free to follow the inequalities and irregularities in the surface of the ground, and to operate in this respect wholly independent of the plow. The forward movement of the plow carries with it the planter, and the rotation of the wheels A in traveling over the ground rotates the axle B, to which they are firmly secured. This rotation of the axle B revolves the wheel $e$ secured thereon, and through the wheel $e$ the wheel $f$ is revolved. This wheel $f$, being attached to the shaft $g$, imparts a rotary movement to such shaft, and this rotary movement of the shaft $g$ rotates the dropping-plate N, bringing the holes $n$ thereof in succession over the opening $o$ and allowing the seed contained in the holes to drop into the seed tube or duct O and to be discharged into the furrow or opening made by the blade or opener Q, where it is covered by the action of the coverers T, which throw the earth over the furrow or opening. The seed to be dropped is placed in the hopper or receptacle K, and the quantity to be dropped is caught in each opening $n$ and carried around therein by the rotation of the plate N until the opening $o$ is reached, the cut-off $p$ preventing more grain than that caught in the opening from passing out with the rotation of the plate N.

As shown, the upper housing, D, support or standard E, shell or rim F, lugs or pendants F', rim or flange H, and shell or rim I are all cast in a single piece, which method of forming these parts is very cheap and simple, as it saves considerable labor in putting the parts together, and also dispenses with the use of rivets or screws for this purpose, as would be the case if the parts were formed single.

This machine is very simple in construction, and none of the parts will be liable to become inoperative. The arrangement is such as to make the machine very compact, and at the same time the effectiveness of the machine is not in the least damaged by this compactness, but, if anything, is increased, as the parts are in such close relation to each other as to assist one in supporting the other, but at the same time sufficient space is left for their operation.

The machine can be attached to an ordinary plow by being connected either with the standard or beam, as may be found most feasible, and this attachment may be made by means of a bolt, as shown, or in some other suitable manner to form a pivotal connection, which allows the plow to be maintained at the desired depth for plowing without being affected by the movements of the planter, and at the same time the planter is free to rise and fall and follow the inequalities of the ground independent of the plow, and the planter can be detached from the plow, and is capable of use as a planter when so detached, a proper connection being made with a double-tree or other device by means of which it can be drawn over the ground.

What I claim as new, and desire to secure by Letters Patent, is as follows:

1. The combination, in a seeding-machine, of the ground-wheels A, connected by the shaft B, the hollow standard E, the housing C D at the lower end of the standard, and the annular rim at the upper end of the standard, said rim supporting the seed-dropper, and the housing and standard serving as a boxing and bearing for the devices which operate the seed-dropper, substantially as described.

2. The combination of the ground-wheels A, connected by the shaft B, the gear-wheel e on the shaft, the vertical shaft g, having at its lower end the gear-wheel f and at its upper end connected with the seeding device, and the standard E, having at its upper end the annular rim F and at its lower end the housing C and D, which close in the gear-wheels, substantially as described.

3. The combination of the ground-wheels A, connected by the shaft B, the gear-wheel e on the latter, the vertical shaft g, having at its lower end a gear-wheel, f, and connecting at its upper end with the seeding device, the standard E, having at its upper end the rim F, provided with a lateral flange, H, which supports the seeding device, and the housing C and D at the lower end of the standard for closing in the gear-wheels which operate the vertical shaft, substantially as described.

4. The combination of the ground-wheels A, connected by the shaft B, the gear-wheel e on the latter, the vertical shaft g, having at its lower end a gear-wheel, f, and connected at its upper end with the seed-dropping disk N, the standard E, having at its lower end the housing C and D for closing in the gear-wheels, and at its upper end the rim F, provided with the flange H, having the opening o, and the cut-off disk or plate M, having the ring portion M', provided with the opening m, substantially as described.

5. The housing or boxing D, standard or support E, rim or shell F, flange H, and rim or shell I, for supporting a seeding device and its operating mechanism on the driving-shaft therefor, substantially as described.

6. The combination of the ground wheels A, connected by the shaft B, housing or boxing C D, through which the shaft passes, standard or support E, rim or shell F, flange H, and rim or shell I, for furnishing a support and inclosing boxing for the seed-dropping devices and operating mechanism therefor, substantially as described.

7. The plate M M', having an annular passage or opening, m, arches or straps l, the plate N N', having seed-openings n, and a suitable cut-off mounted on the plate M M', in combination with the flange or rim H, having an opening, o, shell or rim F, support E, housing or boxing D, and shaft B, substantially as and for the purposes specified.

8. The combination of housing or boxing D, standard or support E, rim or shell F, flange H, and rim or shell I, with the seed-duct O, substantially as and for the purposes specified.

9. The carrying-wheels A and shaft B, in combination with the housing C D, standard or support E, rim or shell F, flange H, rim or shell I, seed-duct O, and blade R, substantially as and for the purposes specified.

10. The straps or bars S, in combination with the rim or shell F, standard or support E, housing C D, shaft B, and carrying-wheels A, for attaching the planter to a plow, substantially as and for the purposes specified.

11. The straps or bars S, in combination with the shell or rim F, having depending ears F', standard or support E, housing C D, shaft B, and carrying-wheels A, for supporting the planting mechanism and attaching the same to the carrying-straps for attachment to a plow, substantially as and for the purposes specified.

12. The combination, in a seeding-machine, of the ground-wheels A, connected by the shaft B, the housing C D, the hollow standard E, the rim F, having flange H, the shell I, carrying the receptacle K, the supporting-bars S S', blades T, seed-duct O, plate Q, and clasp P, all arranged for operation, substantially as described.

BYRON C. BRADLEY.

Witnesses:
ALBERT H. ADAMS,
B. A. PRICE.